United States Patent [19]

Schmittle

[11] Patent Number: 4,596,368
[45] Date of Patent: Jun. 24, 1986

[54] ULTRALIGHT AIRCRAFT WITH FREELY ROTATING WING

[76] Inventor: Hugh J. Schmittle, P.O. Box 790, Severn, Md. 21144

[21] Appl. No.: 544,261

[22] Filed: Oct. 21, 1983

[51] Int. Cl.[4] ............................................... B64C 3/38
[52] U.S. Cl. ........................................ 244/48; 244/13; 244/16; 244/DIG. 14
[58] Field of Search .................... 244/DIG. 1, 16, 13, 244/48, 49, 45 R

[56] References Cited

U.S. PATENT DOCUMENTS

| | | |
|---|---|---|
| D. 243,594 | 3/1977 | Koch . |
| 1,022,903 | 4/1912 | Warrick ........................ 244/DIG. 1 |
| 1,038,306 | 9/1912 | Davison . |
| 1,861,318 | 5/1932 | Page . |
| 2,160,089 | 5/1939 | Schairer . |
| 2,381,679 | 8/1945 | Maxwell . |
| 2,430,793 | 11/1947 | Wells . |
| 2,623,712 | 12/1952 | Spratt . |
| 3,017,137 | 1/1962 | Helmke et al. . |
| 3,135,483 | 6/1964 | Girard . |
| 3,140,842 | 7/1964 | Craigo et al. . |
| 3,258,228 | 6/1966 | Crook ........................... 244/DIG. 1 |
| 3,269,674 | 8/1966 | Girard . |
| 3,361,388 | 1/1968 | Girard et al. . |
| 3,477,664 | 11/1969 | Jones . |
| 3,561,702 | 2/1971 | Jones . |
| 3,730,459 | 5/1973 | Zuck . |
| 3,795,373 | 3/1974 | Gerard . |
| 4,050,654 | 9/1977 | Heckman ..................... 244/DIG. 1 |
| 4,068,810 | 1/1978 | Malewicki . |
| 4,124,180 | 11/1978 | Wolowicz . |
| 4,158,448 | 6/1979 | Mochizuki . |
| 4,262,863 | 4/1981 | Slusarczyk . |

FOREIGN PATENT DOCUMENTS 3046430  7/1982  Fed. Rep. of Germany ... 244/DIG. 1

OTHER PUBLICATIONS

Spratt, George G., "The Control Wing Aircraft", Sport Aviation, Jun. 1974.
Poynter, "Hang Gliding", 1976, p. 68.

*Primary Examiner*—Galen L. Barefoot
*Attorney, Agent, or Firm*—Lowe, King, Price & Becker

[57] ABSTRACT

An ultralight aircraft of lightweight minimal construction includes a collapsible Rogallo type wing from which a hang cage is suspended by a main hinge assembly. The wing includes a longitudinal keel of lightweight tubular construction, leading edge members and a cross brace. A flexible lifting panel is secured along and between the wing members to define a lifting surface. The hinge includes a pitch hinge bracket having an upper longitudinal sleeve in which the keel is clamped. A ball joint connection secured to the bracket is connected to upwardly extending hang cage struts by means of hinge connecting plates to permit free rotation of the wing about a spanwise axis extending longitudinally through the cross brace. Rotation of the wing without pilot intervention induced by positive or negative wind gusts striking the flexible wing panel causes the angle of incidence between the wing and hang cage to vary so that the wing presents a relatively constant angle of attack to relative wind enabling the aircraft to be essentially stall free during flight. A cable and spreader tube arrangement interconnecting forward and trailing ends of the keel to the cross brace undergoes tension and compression loading to distribute bending stress acting on the keel during excessive wind loading to other parts of the aircraft.

16 Claims, 7 Drawing Figures

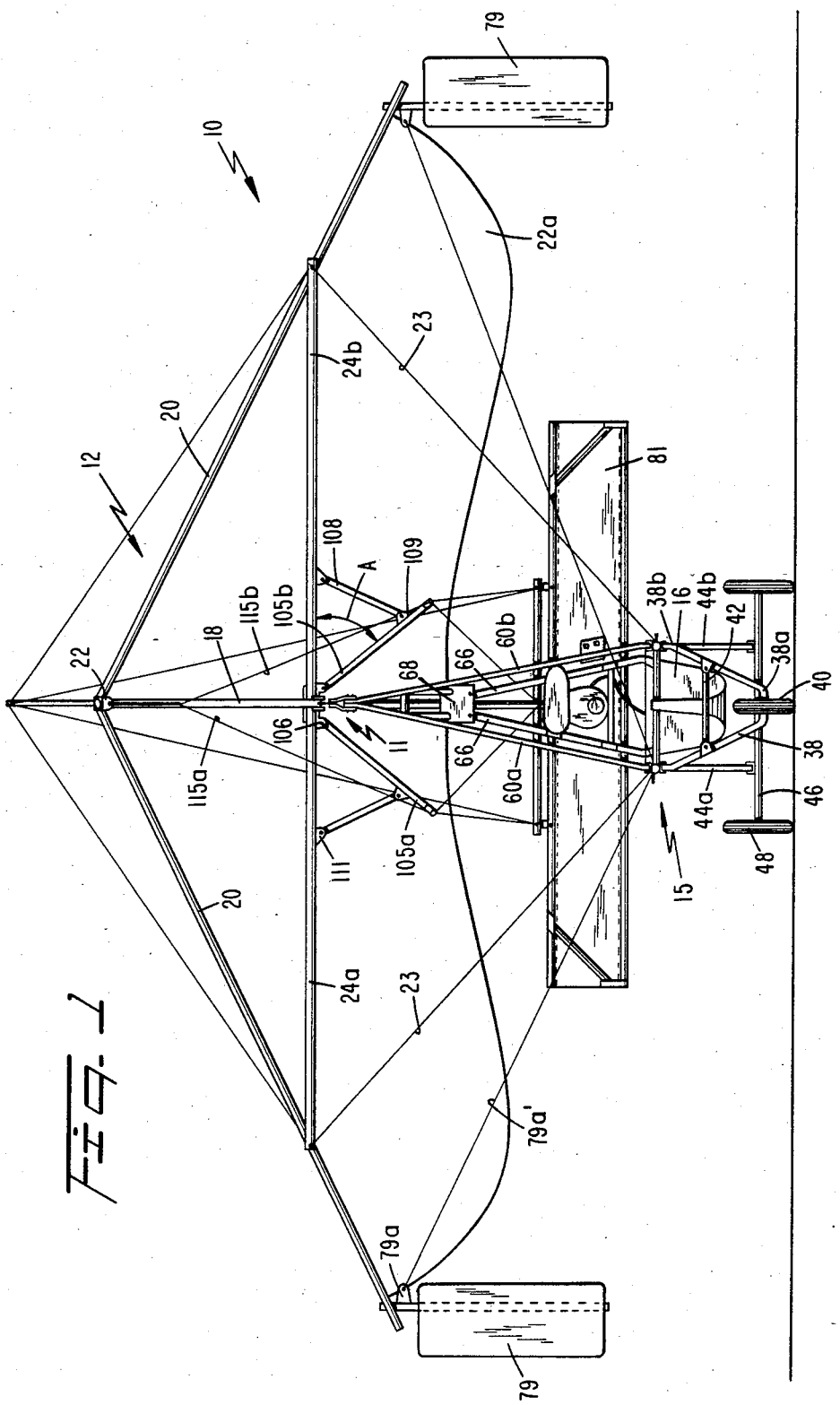

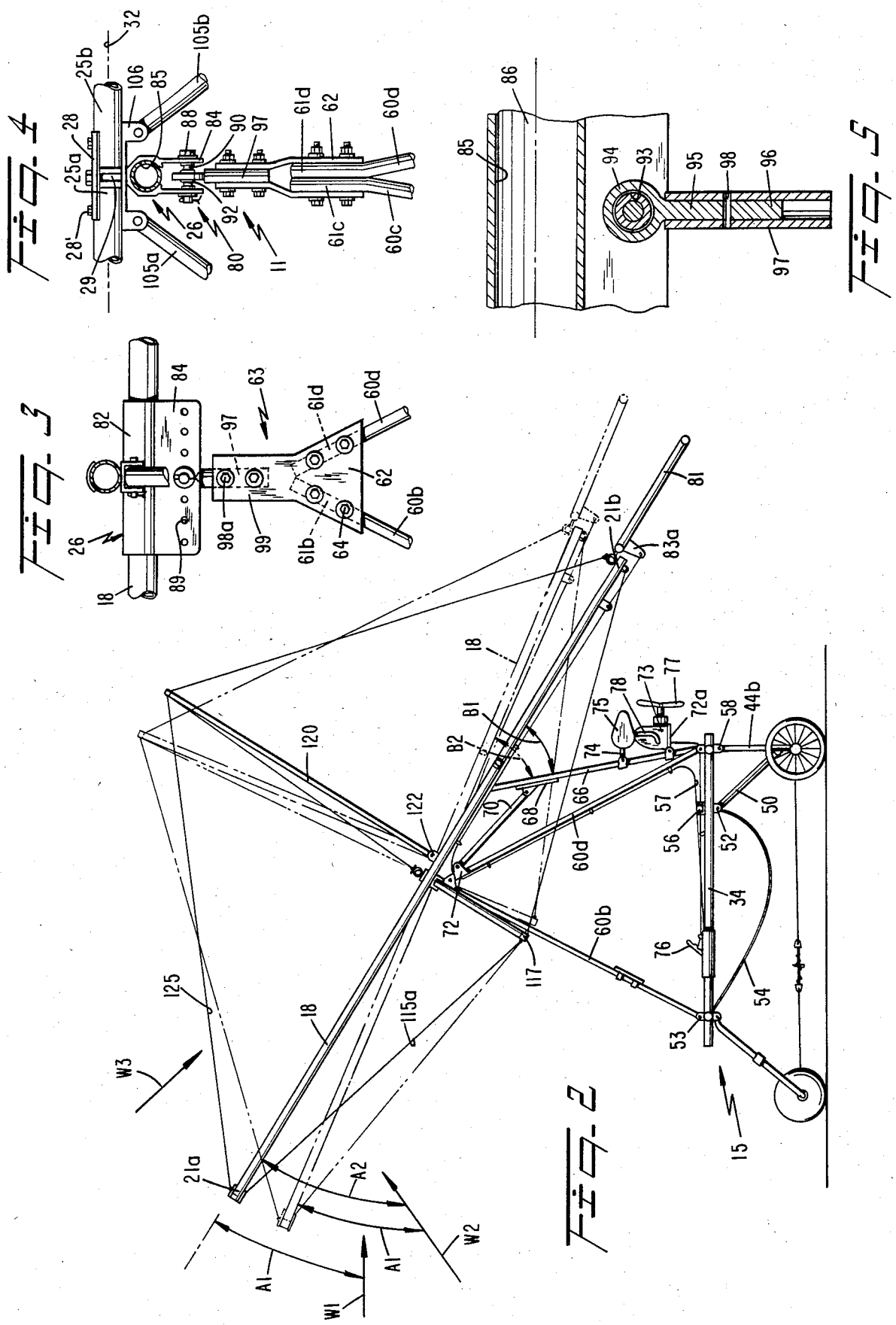

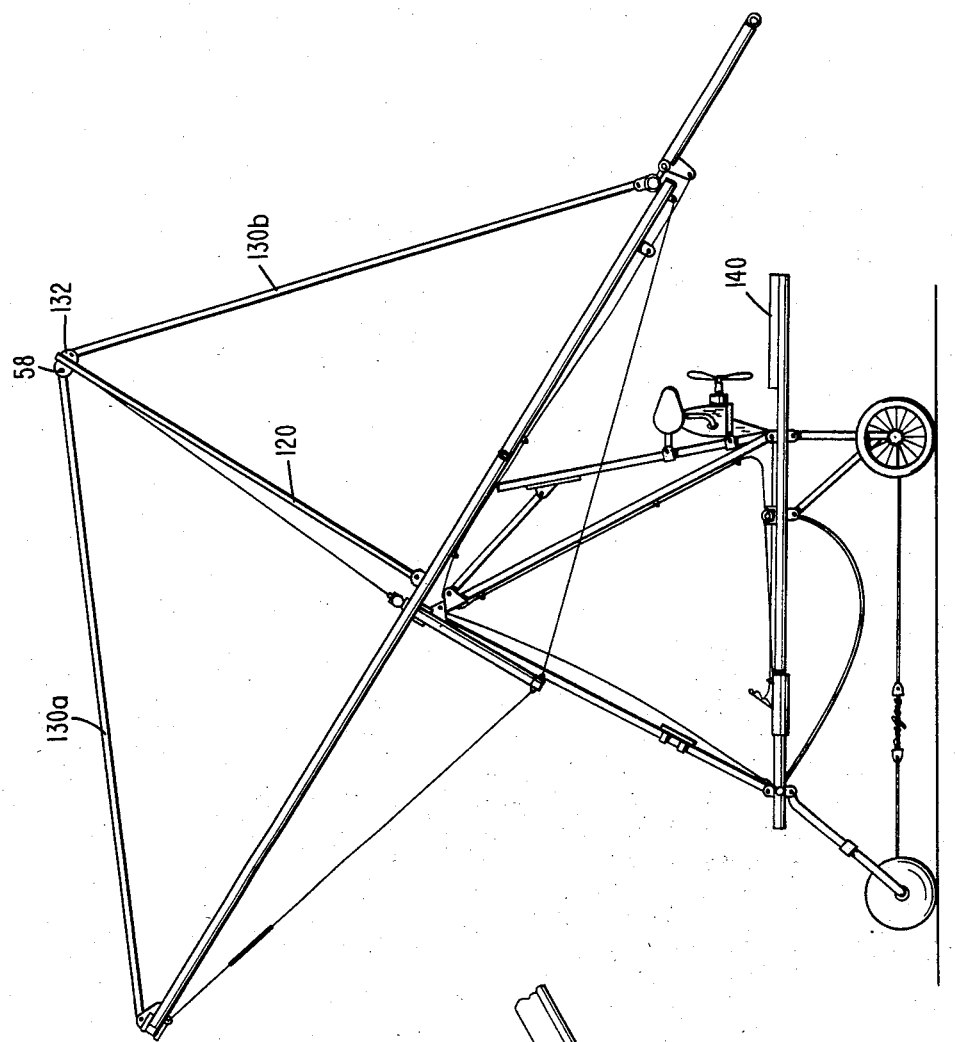
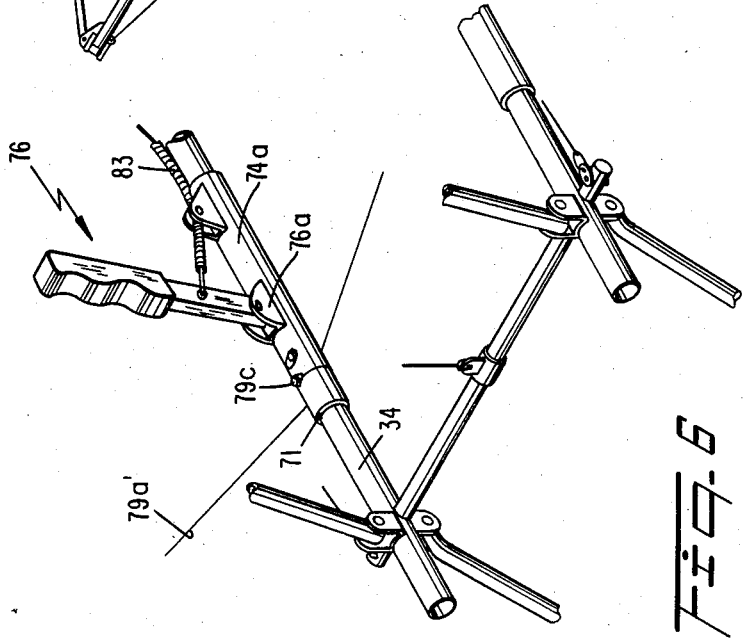

ULTRALIGHT AIRCRAFT WITH FREELY ROTATING WING

TECHNICAL FIELD

The present invention relates to aircraft and, more particularly, to an ultralight aircraft with a foldable flexible wing free to rotate about a spanwise axis to maintain a constant angle of attack with relative wind.

BACKGROUND ART

The ultralight aircraft industry has experienced considerable growth in recent years since ultralights are relatively inexpensive compared to single engine general aviation aircraft, easy to fly, usually run on ordinary automotive fuel, and often require only an 80 foot pasture for a runway.

Generally, an ultralight aircraft comprises an open hang cage formed from high grade aluminum tubing in which a pilot sits on a canvas seat. A small engine, such as a two cycle-twin cylinder engine, is supported on engine mountings behind the pilot. A fuel tank is mounted to the hang cage above the engine. The wing, which can be rigid or collapsible (i.e., a Delta or Rogallo type wing such as the type described in U.S. Pat. No. 2,546,078 to G. S. Rogallo et al) is usually king post and cable braced to the hang cage, or strut braced. With this construction, an ultralight is of minimal weight to reduce take off and landing distances while maintaining reasonable power requirements by permitting the carrying of sufficient fuel for a useful operating range.

A flexible wing construction is one wherein the wing has a central longitudinal keel with leading edge members extending outward and rearward from a forward end of the keel, with lifting surfaces taking the form of flexible panels, usually fabric, of generally a triangular shape secured along the keel and leading edge members and extending therebetween. One disadvantage of the construction is very low wing loading capability, and lack of safe operation under turbulent conditions. Indeed, pilot discomfort is often so pronounced, that comfortable or even safe operation of ultralights must be limited to early morning and late afternoon periods, to avoid thermals, or relatively calm days when wind is low. Otherwise, subjecting these aircraft to gust loads may structurally damage the wing, often with fatal results.

One method of avoiding excessive wing loading is by attaching the wing to the hang cage or fuselage so that the wing is free to pivot about a spanwise axis forward of the aerodynamic center of the wing. Thus, so that the wing is subject to only aerodynamic pitching movements imposed by wing lift and drag. Among the various advantages realized when employing a free wing are alleviation of gust loads, simplicity in fuselage or hang cage design, extension of travel limits for center of gravity, improved fuselage or hang cage attitude trim, and avoidance of hang cage rotation at lift off and landing. Excessive wing loading is also avoided since the aerodynhmic center of pressure of the wing automatically shifts as the wing interacts with changing relative wind (e.g., wind gusts); in other words, the wing pitches up or down to maintain a constant angle of attack to avoid excessive wing loading and enable stall free flight.

For rotatability, free wings must be hinged to the air frame or hang cage and supported thereon in a spanwise or longitudinal plane. However, known hinge construction techniques of which I am aware generally utilize rather complex and expensive hinging mechanisms, such as is disclosed in U.S. Pat. No. 3,361,388 to Girard et al. Furthermore, since the free wing is still subject to bending stress transmitted by the flexible panels to the keel, prior art aircraft of which I am aware generally utilize structurally complex or heavy keels capable of absorbing bending moments, such as a rigid box spar keel member disclosed in U.S. Pat. No. 3,140,842 to Craigo et al or the rigid, solid keel disclosed in the above patent to Girard et al. These prior art keels and the complex mechanisms used for hinging same to the air frame are expensive and unnecessarily increase aircraft weight.

It is accordingly an object of the instant invention to provide an improved free wing especially for ultralight aircraft as well as for conventional aircraft.

It is another object to provide a free wing for ultralight aircraft having improved gust alleviation characteristics.

A further object of the invention is to provide an effective means for hinging a wing having a light weight tubular keel of hollow construction to a hang cage so that the wing is free to rotate in pitch.

Another object of the invention is to provide a free wing wherein bending loads acting upon the keel of an ultralight aircraft are converted into tension and compression loads distributed to other structural parts of the wing using an inexpensive and light weight cable and spreader tube arrangement.

Another object of the invention is to provide a free wing in an ultralight aircraft utilizing a simple, inexpensive yet reliable hinging mechanism for securing the wing to the aircraft.

Yet another object is to provide a free wing in an ultralight aircraft wherein the sole connecting structure between the wing and hang cage is the hinge mechanism permitting rapid detachment of the wing from the hang cage.

DISCLOSURE OF THE INVENTION

An aircraft according to the present invention, especially an ultralight aircraft, comprises a hang cage having plural tubular members connected to define a base frame for seating a pilot therewithin and further includes at least one upwardly extending strut for securing the hang cage to the wing. The wing has a longitudinal central keel and leading edge members connected to and extending rearwardly from a forward end of the keel. A flexible lifting panel is secured along and between the keel and leading edge members to define a lifting surface. A pitch hinge bracket is attached to the upwardly extending strut and includes a sleeve receiving a portion of the keel therewithin. The hinge bracket is located forward of the aerodynamic center of the wing, and permits the wing to freely rotate without pilot intervention about a spanwise axis extending generally perpendicular to the keel longitudinal axis so that the flexible lifting panel maintains a substantially constant angle of attack irrespective of abrupt changes in relative wind tending to be caused by wind gusts.

To minimize aircraft weight, the keel is preferably formed as a light weight tubular, somewhat flexible member of hollow construction. A pair of cables are connected at their opposite ends to forward and trailing ends of the keel and respectively pass through lower ends of spreader tubes inclined outwardly and downwardly from the keel. Each spreader tube is maintained in an inclined position at a predetermined angle to the keel by a support tube fixed at a lower end thereof to a lower end portion of the associated spreader tube and at an upper end thereof to the wing crossbar. Each cable and spreader tube arrangement operates to distribute bending stress loads transmitted to the keel by relative wind striking the flexible lifting panel to the wing cross brace.

Each spreader tube and cable arrangement respectively lies in a common plane offset downwardly from the cross brace by an angle of approximately 45°.

The pitch hinge bracket preferably includes a longitudinally extending upper sleeve member integrally formed with a pair of longitudinal parallel bracket arms extending downwardly therefrom. The sleeve defines a longitudinal mounting channel receiving the keel in clamping engagement. A ball joint connection is located between the bracket arms defining a rotational axis being generally parallel to the spanwise axis about which the wing rotates. The ball joint connection includes a spherical ball carried on a stub shaft extending transversely between the bracket arms. A rod end bearing shaft, an upper end of which has a socket with a concave cylindrical track surrounding the spherical ball, includes a lower shaft portion affixed to the upwardly extending hang cage strut through a hinge connecting plate.

To minimize negative bending moments acting on the keel caused by downwardly directed wind gusts striking the upper surface of the flexible wing panel, the preferred embodiment of the invention provides a single spreader tube connected to extend vertically upward from the keel. A cable passing through the upper end of the spreader tube is connected at opposite ends to forward and leading ends of the keel so that as bending moments occur, the cable tensions to absorb stress which is then transmitted to the spreader tube which loads in compression so that the keel experiences only minimal stress loading.

In a second embodiment of the invention, the upper cable is replaced by a pair of reinforcement tubes capable of loading in compression or tension to minimize stress loading of the keel should either upward or downward wind gusts strike the flexible wing panel. In this embodiment, the two lower spreader tubes may be eliminated since both positive and negative loads are absorbed by the reinforcement tubes. Alternatively, the two lower spreader tubes can remain, with their cables replaced by tubing. In such a case the upper spreader assembly could be eliminated.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWING

FIG. 1 is a front plan view of an ultralight aircraft constructed in accordance with the present invention showing the wing pivotally connected to the aircraft hang cage;

FIG. 2 is a side elevational view of the ultralight of FIG. 1 illustrating the positioning of a cable and spreader tube arrangement used to minimize bending stresses acting on the keel caused by relative wind;

FIG. 3 is a sectional view taken along the line 3—3 of FIG. 1 showing a detailed view of the pitch hinge mounting bracket connecting the wing keel to upwardly extending struts of the hang cage;

FIG. 4 is a sectional view taken along the line 4—4 of FIG. 2 showing a further illustration of the pitch hinge mounting bracket and ball joint connection pivotally connecting the wing to the hang cage;

FIG. 5 is a sectional view taken along the line 5—5 of FIG. 4 to further illustrate the ball joint connection;

FIG. 6 is a partial perspective view of the hang cage shown in FIG. 1; and

FIG. 7 is a side elevational view of a second embodiment of the present invention to show an alternative means for distributing negative bending movements acting on the keel to other parts of the wing.

BEST MODE FOR CARRYING OUT THE INVENTION

Referring to FIG. 1, aircraft 10 comprises a wing 12 from which is uniquely suspended by a main hinge assembly 11, a hang cage 15 to carry a pilot (not shown) in seat 16 or carrying some other suitable payload. Wing 12 is of a flexible wing construction, such as a collapsible Rogallo-type wing illustrated in the drawing, having a tubular, longitudinal keel 18, with leading edge members 20 extending outward and rearward from the forward end 21 thereof. The lifting wing surface is a flexible panel 22a (FIG. 1 only) of generally triangular shape secured along keel 18 and leading edge members 20 and extending therebetween. Leading edge members 20, at their forward ends, preferably have pivotal connections 22 at front end 21 of keel 18 to facilitate folding and are held in an extended position by a pair of cross bars 24a and 24b extending transverse from the keel. As illustrated in FIG. 4, inner ends 25a and 25b of cross bars 24a, 24b respectively face each other and are rigidly connected together with connecting bracket 28 and bolts 28' and to pitch hinge bracket 26 receiving keel 18 by means of a single bolt 29. Flying wires 23 extend from outer ends of the cross bars for connection to hang cage 15 to maintain the wing in expanded position and absorb bending loads acting on the cross bars during flight.

Hinge bracket 26 forms a part of main hinge assembly 11 connecting wing 12 to hang cage 15 in the unique manner described below so that the wing is free to rotate without pilot intervention about a span-wise axis 32 extending longitudinally through cross bars 24a, 24b. Rotation of wing 15 without pilot intervention induced by positive or negative wind gusts striking flexible panel 22 causes the angle of incidence between the wing and hang cage 15 to vary so that the wing presents a relatively constant angle of attack to the relative wind enabling aircraft 10 to be essentially stall-free during flight and capable of dumping excessive wind loadings from the wing to avoid structural failure thereof and to increase pilot comfort in turbulence.

Hang cage 15 comprises a pair of longitudinal, parallel tubular members 34 interconnected at opposite ends by forward and rear cross tubes 36 defining a rectangular base frame 30. Projecting downward from forward ends of members 34 is a U-shaped nose wheel landing gear leg 38 rotatably supporting a nose wheel 40 at a lower apex thereof. A cross brace 42 interconnects intermediate portion of legs 38 between lower apex 38a and upper ends 38b for maximum strength. A pair of main landing gear legs 44a and 44b extend vertically downward from rear ends of tubular members 34 respectively to rigidly support an axle 46 carrying a pair of main landing wheels 48 at opposite ends thereof. Main legs 44a and 44b are reinforced by support struts 50 inclined upwardly and forwardly to connect lower ends of the main legs to frame members 34 with brackets 52. A seat 54, preferably of canvas or like material, is slung between members 34 and supported at forward and rear ends by forward cross tube 36 and a cross support tube 56 supported between members 34 on U-shaped bracket 57.

The above structural members defining hang cage 15 are basically tubular for minimum weight with maximum strength and utilize U-shaped brackets (e.g., 52) and quick release pins 58 to simplify interconnection and rapid disassembly of the various components. However, it will be appreciated that other types of fuselage can be suspended from wing 12 by hinge 11 without departing from the invention.

To interconnect hang cage 15 to wing 12 in the unique manner below, four of hang cage tubular struts 60a, 60b, 60c and 60d are respectively connected to forward and rear ends of members 34 with brackets 53 and pins 58 and converge upwardly therefrom to a point above seat 54 where upper ends 61a, 61b, 61c, and 61d of the struts are each respectively fixed to a lower trigangular flange skirt portion 62 of a pair of hinge connecting plates 63 with bolts 64 (see FIGS. 3 and 4). Extending upwardly and forwardly from lower ends of member 34 is a pair of engine support struts 66 connected together at upper portions thereof with a plate 68. The plate 68 defines the apex of a triangle formed by these tubes and acts as a wing stop, i.e., preventing keel 18 from intersecting with the prop disc. A pair of support tubes 70 are inclined forwardly to interconnect plate 68 to upper ends of hang cage rear struts 60c and 60d with brackets 72 at a point beneath hinge plates 63.

Engine mountings 72a carrying an engine 73 and fuel tank mountings 74 carrying fuel tank 75 are fixed to support struts 66 to support the engine and tank behind seat 54. Engine 73, which is illustrated as a small internal combustion engine driving a pusher propeller 77, is supplied with fuel from tank 75 through fuel line 78, with the fuel supply to the engine carburetor conventionally controlled by a throttle 76 (FIG. 2 only) mounted on left hand tubular member 34. The specific engine and fuel mountings will depend on the engine and fuel tank used, that shown being typical.

Rotatably mounted on the right hand tubular member 34 between stops 71 is a sleeve 74 carrying control stick 76 pivotably connected to the sleeve with bracket 76a. Left and right wing tip rudders 79, of conventional construction and operation, are pivotally attached (FIG. 1 only) to leading edge member 20. Each rudder 79 includes a control horn 79a that is interconnected to sleeve 74 with a pair of actuating cables 79a'. As illustrated in FIG. 6, ends of cables 79a' extend partially around sleeve 74 from opposite directions, respectively, and are attached to the sleeve with pins 79c. In this manner, clockwise or counterclockwise rotation of control stick 76 by the pilot causes corresponding movement of sleeve 74 so that one of cables 79a' is retracted to deflect the associated left or right rudder, thereby steering aircraft 10 in the desired direction.

Elevator or 'stabilator' 81, hinged to rear end 21b of keel 18 in a known manner, is interconnected to control stick 76 by means of a motorcycle cable 83 attached to elevator control horn 83a. Fore and aft movement of control stick 76 respectively causes downward and upward deflection of elevator 81 through cable 83 to decrease or increase the angle of attack of wing 12 in a conventional manner.

Referring to FIGS. 3–5, main hinge assembly 11 comprises a pitch hinge bracket 26 pivotally connected to hinge connecting plate 63 by means of a ball joint connection 80 located slightly aft of the aerodynamic center of lift of wing 12, as indicated at AC in FIG. 2.

Hinge bracket 26 is of unitary construction having a longitudinally extending upper sleeve member 82 integrally formed with a pair of longitudinal parallel bracket arms 84 extending vertically downward therefrom. A longitudinal mounting channel 85 having an internal cylindrical wall 86 extends through sleeve 82 and is open at opposite ends thereof to receive keel 18 in clamping engagement. More specifically, channel wall 86 is open at a bottom 86a thereof in communication with the space between bracket arms 84 so that during initial mounting of wing 12 to hang cage 15, the bracket arms can be gently spread apart temporarily to enlarge channel 85 enabling the keel to be received in the channel through bottom 86a thereof. Thereafter, outer cylindrical surfaces of keel 18 are tightly clamped against cylindrical wall 86 in strong frictional contact by means of a bolt 88 and butterfly nut 88a extending transversely through one set of plural aligned holes 89 in bracket arms 84.

A stub shaft 90 carried by bolt 88 extends transversely between bracket arms 84 and includes a spherical ball 92. The ball 92 is captured within a concave cylindrical track 93 of a socket 94 forming the upper end of a rod end bearing shaft 95. The lower shaft portion 96 of rod end bearing shaft 95 is received within a hollow cylindrical sleeve 97 and affixed thereto by a locking pin 98 passing radially through the sleeve and shaft. Nut and bolt connections 98a are used to fix sleeve 97 between parallel arms 99 integrally formed with and extending upwardly from lower flanges 62 of hinge connecting plate 63 so that the ball joint connection 80 defined by ball 92 and socket 94 is located above hang cage support struts 60a–60d and beneath keel 18.

Ball joint connection 80, connecting wing 12 to cage 15, permits clockwise and counterclockwise rotation of the wing about spanwise axis 32 (i.e., by virtue of ball 92 smoothly rotating in a vertical plane within socket 94) through a predetermined angular interval as well as limited roll about a longitudinal axis of the keel, as will be discussed more fully below.

Since keel 18 is a somewhat flexible, lightweight tubular member, preferably extruded aluminum tubing having an outer diameter of $1\frac{3}{8}$ inches and a uniform wall thickness of 0.058 inches (Alloy #6061-T6), it is important that bending loads caused by upward and downward gusts of wind tending to be transmitted to the heel upon striking flexible wind panel 22a be uniformly distributed throughout the wing structure to prevent structural failure of the keel. While sleeve 26 distributes stress along portions of the keel in contact therewith, to effect uniform distribution of wind forces throughout wing 12, a pair of spreader tubes 105a and 105b are respectively hinged at upper ends thereof to cross bars 24a, 24b adjacent keel 18 with brackets 106 and pins 58 as shown in FIG. 4. Each spreader tube 105a, 105b, lying in a common vertical plane, is inclined outwardly and downwardly from keel 18 by an angle A of preferably 45° with respect to cross bars 24a, 24b and is maintained in this position by a support tube 108. As shown in FIG. 1, support tubes 108 are pivotally fixed at lower ends thereof with brackets 109 to lower end portions of tubes 105a, 105b and are inclined upwardly and outwardly for pivotal connection to cross bars 24a, 24b with brackets 111. As best illustrated in FIG. 2, a pair of single cables 115a, and 115b preferably steel, each run from leading edge of keel 18 and pass through a hole formed in the lower or distal end 117 of spreader tubes 105a, 105b respectively, and terminate at trailing edge 21b of the keel.

Each separate spreader tube and cable arrangement 105a, 115a or 105b, 115b located on opposite sides of keel 18 respectively lies in a common plane offset downwardly from spanwise axis 34 by an angle A of about 45° so that support tubes 108 are under minimal stress. Additionally, the foregoing orientation of 45° of each spreader tube and cable arrangement outwardly from a vertical plane passing longitudinally through keel 18 prevents interference with main hinge assembly 11 or the aircraft control mechanisms, as well as the engine and propeller assembly.

Each spreader tube and cable arrangement described above uniquely cooperates with main hinge assembly 11 to cantilever keel 18 to cross bars 24a, 24b so that when wing panel 22a is under an increased positive load, such as caused by an upward wind gust striking the lower surface of the wing panel, the keel is effectively relieved of virtually all bending loads in the manner described below. To relieve the keel from negative loads such as caused by a downward wind gust striking the upper surface of wing panel 22, a single large spreader bar 120 is connected to keel 18 at a lower end thereof by bracket 122 and projects vertically upward. A single cable 125 having opposite ends respectively fixed to front end 21a and trailing end 21b of keel 18 passes through the upper end of spreader bar 120 to relieve the keel of negative loads, as described infra.

To best understand the invention, the operation of aircraft 10 will now be described. Assume that aircraft 10 shown in FIGS. 1 and 2 is in straight and level flight at a predetermined power setting of engine 73. In this flight attitude, relative wind vector W1 is oriented horizontally to strike the underside of wing panel 22 at an angle of attack A1 to produce lift. Now assume that aircraft 10 suddenly encounters an upward wind gust causing the relative wind vector to shift counterclockwise to W2 and form an angle of attack A2 with wing 12, where A2>A1. In a conventional fixed wing aircraft, angle of attack A2, depending on the magnitude of relative wind vector W2, could possibly exceed the design angle of attack of the fixed wing causing the aircraft to pitch up and stall. However, in aircraft 10 of the invention, as relative wind vector W1 changes to W2, the increased wind mass suddenly striking the major portion of wing panel 22 located aft of main hinge assembly 11 causes the wing to rotate counterclockwise about spanwise axis 32 via ball joint connection 80 by virtue of the greater lift component now acting on the wing panel aft of the hinge. Wing 22 thus pitches down into the phantom line position shown in FIG. 2 and thereby dumps the wind gust load from the wing. Thus, at a predetermined power setting wing 12 tends to seek neutral stability by self adjusting about pitch axis 34 to maintain a constant angle of attack A1 with new relative wind vector W2. Of course, hinge 11 causes the angle of incidence B1 (formed between wing 12 and cage 15 by the intersecting longitudinal axes of keel 18 and frame members 34 when the relative wind vector is W1) to change to B2 (where B2<B1) when the wind vector becomes W2, assuming that the cage remains in a neutral, horizontal attitude without being buffeted about. By this means, pitch fluctuation of wing 12 is effectively damped and aircraft 10 is very stable since main hinge assembly 11 provides very effective automatic stability since any pitching motion of the wing due to flight conditions not intentionally caused by the pilot will cause a change in angle of incidence B1 without substantially affecting angle of attack A1.

While the aforesaid pitching motion dumps a large part of the wind gust load from wing 12, keel 18 nonetheless experiences bending loads as it pivots about ball joint 80 from angle of incidence B1 to B2. In other words, as relative wind vector W2 strikes wing panel 22a, it produces a positive wind load vector which exerts an upward force at right angles to the keel respectively at forward and aft sections thereof on opposite sides of the hinge. Then load vector is usually greater than the load vector achieved with wind vector W1; the resultant differential loading normally tends to bend both end sections 21a and 21b of the keel upwardly about the hinge. However, as this bending stress occurs, cables 115a, 115b tension to absorb the stress which is then transmitted to spreader tubes 105a, 105b which become loaded in compression to distribute stress to cross bars 24a, 24b. Since the upper ends of tubes 105a, 105b are located in close proximity to hinge assembly 11, it will be appreciated that a large bending moment does not act upon the cross bars that might otherwise become structurally fatigued. Furthermore, since spreader tubes 105a, 105b respectively lie in the same plane as cables 115a, 115b, support tubes 108 projecting outwardly therefrom only experience minimal compression loading yet nonetheless operate to distribute some of the stress to the cross bars. In this manner, keel 18 experiences only minimal stress compression loading, thus allowing the keel and cross bars to be formed as lighter and more compact structures than those utilized in prior art aircraft.

Should wing 10 suddenly encounter a downward gust of wind (i.e., wind vector W3), the wing is allowed to rotate clockwise about hinge 11 (i.e., spanwise axis 34) so that the wing pitches up (not shown) to dump a substantial part of the wind gust loading from the wing. As wind vector W3 strikes the upper surface of wing lifting surface 22a, it produces a negative wind load vector which tends to bend both end sections 21a, 21b of keel 18 downwardly about the hinge. However, as this bending stress occurs, cable 125 tensions to absorb the stress which is then transmitted to spreader tube 120 which becomes loaded in compression so that the keel experiences only minimal stress loading. Furthermore, by fixing the lower end of spreader 120 to keel 18 with bracket 122 at a point slightly aft of hinge 11, the compression force transmitted longitudinally through spreader 120 assists in pivoting the keel about hinge 11 and thereby wing 12 in the desired clockwise direction to rapidly dump the excess loading around wind gust vector W3.

FIG. 7 illustrates a second embodiment of the present invention wherein cable 125 is replaced by a pair of reinforcement tubes 130a and 130b capable of loading in compression or tension to minimize stress loading of keel 18. Tubes 130a, 130b connect the upper end of spreader tube 120 to front and rear ends 21a, 21b of keel 18, respectively, with bracket 132 and quick release pins 58. Since tubes 130a, 130b are rigid, they can load in either tension or compression should upward or downward wind gusts W2 or W3 occur, and are preferred for use instead of cable 125 when aircraft 10 is designed to carry especially heavy positive loads (e.g., crop dusting, seeding, military uses).

As the term is used herein (and defined by the Federal Aviation Administation), an 'ultralight' aircraft typically weighs no more than 254 pounds, including the engine; can carry no more than 5 gallons of gas; is limited to a single occupant, has a maximum level flight speed of 55 knots; stalls at no more than 24 knots with the power off and can fly only during daylight hours with good visibility over noncongested areas. However, it will be appreciated that the main hinge assembly and spreader tube/cable arrangement of the invention can be utilized in other types of aircraft where the wing is formed with a light weight keel capable of withstanding only low-wing loading. Since wing 12 is free to pivot about hinge 11 without pilot intervention, causing the angle of incidence with hang cage 15 to vary, I have discovered that application of additional throttle power during flight initially tends to cause the hang cage to rotate clockwise, decreasing the effective thrust component (i.e. without changing the angle of attack) and causing the aircraft to sink. To avoid this problem, a horizontal stabilizer 140 (FIG. 7 only) can extend transversely between rearwardly extending portion of tubes 34 to counter the clockwise rotational movement of hang cage 15 during application of additional power.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. An aircraft, comprising:
   (a) a fuselage;
   (b) a flexible wing having a longitudinal central keel, leading edge members connected to and extending rearwardly from a forward end of said keel, a flexible lifting panel secured along and between said keel and leading edge members;
   (c) a pitch hinge bracket means attached to fuselage and connected to the wing for permitting the wing to freely rotate without pilot intervention about a spanwise axis extending generally perpendicular to the keel longitudinal axis so that the flexible lifting panels maintain a substantially constant angle of attack irrespective of abrupt changes in relative wind tending to be caused by wind gusts without changing the attitude of the fuselage; and
   (d) means for distributing bending stress loads acting upon opposite ends of the keel to a central portion thereof adjacent the hinge, said loads being induced by relative wind striking the lifting panel causing bending loads to act upon forward and trailing ends of the keel, said stress distributing means including first connecting means attached to said leading and trailing ends and second connecting means connected to the first means for distributing loads transmitted from the first means to the central portion, said first and second connecting means being structures mounted outside the fuselage and incapable of manipulation by the pilot to vary the angle of incidence of the wing with respect to relative wind.

2. The aircraft of claim 1, wherein said stress distributing means includes cable means connected to forward and trailing ends of the keel and spreader bar means connected to extend downwardly from a cross brace attached to the keel and forming part of said flexible wing, said cable means being received in said spreader bar means, said bending loads acting on the keel at forward and trailing ends thereof being transmitted to the cable means as tension loads and to the spreader bar means as compression loads transmitted to the cross brace.

3. The aircraft of claim 2, wherein said cable means includes a pair of cables and said spreader bar means includes a pair of spreader bars and a pair of support tubes, said spreader tubes respectively being inclined outwardly and downwardly from the keel on opposite sides of the fuselage at a predetermined angle and being maintained in the inclined position by one of the support tubes being pivotally fixed at a lower end thereof to a lower end portion of the associated spreader tube and being inclined upwardly and outwardly for pivotal connection to the cross bar, said cables respectively extending through the lower end of the associated spreader tube.

4. The aircraft of claim 3, wherein each spreader tube and cable arrangement respectively lies in a common plane offset downwardly from the spanwise axis by an angle of approximately 45°.

5. The aircraft of claim 4, further including a third spreader bar connected to project vertically upward from the keel and a third cable having opposite ends respectively fixed to front and trailing ends of said keel and passing through the upper end of the third spreader bar to thereby relieve the keel of negative wind gust loading.

6. The aircraft of claim 4, further including a third spreader bar to extend vertically upward from the keel and a pair of reinforcement tubes each connected at an upper end thereof to an upper end of the spreader tube and two front and trailing ends of said keel respectively, each reinforcement tube being substantially rigid and capable of loading in compression or tension when upward or downward wing gusts respectively strike the flexible wing panel.

7. The aircraft of claim 1, wherein said pitch hinge bracket means includes a longitudinally extending upper sleeve member integrally formed with a pair of longitudinal parallel bracket arms extending downwardly therefrom, said sleeve defining a longitudinal mounting channel receiving the keel in clamping engagement, ball joint connect means located between the bracket arms defining a rotational axis of said wing being generally parallel to the spanwise axis, and hinge connecting plate means for connecting the ball joint connection means to the upwardly extending strut.

8. The aircraft of claim 7, wherein said ball joint connection means includes a stub shaft extending transversely between the bracket arms, a spherical ball carried on the stub shaft, and a rod end bearing shaft an upper end of which having a socket with a concave cylindrical track surrounding the spherical ball, a lower shaft portion of said rod end bearing shaft being received within a hollow cylindrical sleeve affixed thereto by a locking pin passing radially through the sleeve and shaft, wherein said hinge connecting plate means includes a pair of hinge connecting plates with upper ends thereof bolted to said lower shaft portion.

9. The aircraft of claim 8, wherein said ball joint connection means constitutes the sole connecting structure between the wing and the hang cage.

10. The aircraft of claim 8, further including means for releasably mounting the ball joint connection means between the bracket arms to thereby quickly detach the wing from the hang cage.

11. The aircraft of claim 7, wherein said wing is of flexible and collapsible construction.

12. The aircraft of claim 1, further comprising an elevator hinged to a trailing end of the keel, and control means connected to the elevator and being actuated by the pilot for pivoting said elevator with respect to said keel to vary the angle of incidence and thereby the angle of attack of the wing.

13. The aircraft of claim 1, wherein said first connecting means includes a pair of tubular members respectively attached to forward and trailing ends of said keel and said second connecting means includes a third tubular member connected at one end thereof to the wing proximate a central portion of the keel and at an opposite end to said first and second tubular members, said first and second tubular members being capable of tension and compression loading induced respectively by positive and negative wind gusts striking the flexible panel to transmit said loading as compression loading to the third tubular member.

14. An ultralight aircraft, comprising:
(a) a hang cage having plural tubular members connected to define a base frame for containing a pilot therewithin and a means for supporting an engine and fuel supply means on the base frame; said hang cage further including plural upwardly extending struts attached at upper ends thereof to a hinge connecting plate;
(b) a wing having a longitudinal central keel, leading edge members connected to and extending rearwardly from a forward end of said keel, a cross brace member connected to and extending transversely from opposite sides of said keel, opposite ends of said cross brace member being respectively attached to the leading edge members, and a flexible lifting panel secured along and between said keel, cross brace member and leading edge members, said flexible panel being unsecured along a trailing edge thereof, said keel being hollow and tubular for minimum weight with maximum strength;
(c) a pitch hinge bracket means connecting the wing to the upwardly extending plural struts for permitting the wing to freely rotate without pilot intervention about a spanwise axis extending perpendicular to the keel longitudinal axis so that the flexible lifting panel maintains a substantially constant angle of attack irrespective of changes in relative wind tending to be caused by wind gusts; and
(d) means for distributing bending stress loads acting upon opposite ends of the keel to a central portion thereof adjacent the hinge, said loads being induced by relative wind striking the lifting panel causing bending loads to act upon forward and trailing ends of the keel, said stress distributing means including first connecting means attached to said leading and trailing ends and second connecting means connected to the first means for distributing loads transmitted from the first means to the central portion, said first and second connecting means being structure mounted outside the fuselage and incapable of manipulation by the pilot to vary the angle of incidence of the wing with respect to relative wind.

15. The aircraft of claim 14, further including a horizontal stabilizer fixedly attached to the hang cage and being immovable, said stabilizer preventing clockwise rotational movement of the hang cage during application of increased power during flight.

16. An aircraft, comprising:
(a) a hang cage having plural tubular members connected to define a base frame for containing a pilot therewithin and a means for supporting an engine and fuel supply means on the base frame, said hang cage further including plural upwardly extending struts attached at upper ends thereof to a hinge connecting plate;
(b) a wing having a longitudinal central keel, leading edge members connected to and extending rearwardly from a forward end of said keel, a cross brace member connected to and extending transversely from opposite sides of said keel, opposite ends of said cross brace member being respectively attached to the leading edge members, and a flexible lifting panel secured along and between said keel, cross brace member and leading edge members, said keel being hollow and tubular for minimum weight with maximum strength and of greater length than the hang cage;
(c) a pitch hinge bracket means connecting the wing to the upwardly extending plural struts, said hinge means permitting the wing to freely rotate without pilot intervention about a spanwise axis extending perpendicular to the keel longitudinal axis so that the flexible lifting panel maintains a substantially constant angle of attack irrespective of changes in relative wind tending to be caused by wind gusts; and
(d) means for distributing bending stress loads transmitted to opposite ends of the keel by relative wind striking the flexible lifting panel, said stress distributing means including first connecting means connected to forward and trailing ends of the keel and being further connected to second connecting means attached to the cross brace, said first means being received in said second means so that bending loads acting on the keel at forward and trailing ends thereof are transmitted to the first means as tension loads and to the second means as compression loads distributed to the cross brace, said first and second means being structures mounted outside the hang cage and incapable of manipulation by a pilot to avoid varying the angle of incidence of the wing.

* * * * *